US009082000B2

(12) United States Patent
Nakashima (10) Patent No.: US 9,082,000 B2
(45) Date of Patent: Jul. 14, 2015

(54) IMAGE PROCESSING DEVICE AND IMAGE PROCESSING METHOD (71) Applicant: FUJITSU LIMITED, Kawasaki-shi, Kanagawa (JP)

(72) Inventor: Satoshi Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 162 days.

(21) Appl. No.: 13/835,052

(22) Filed: Mar. 15, 2013

(65) Prior Publication Data

US 2013/0243251 A1    Sep. 19, 2013

(30) Foreign Application Priority Data

Mar. 16, 2012  (JP) ................................. 2012-061203
Jan. 25, 2013  (JP) ................................. 2013-012703

(51) Int. Cl.
G06K 9/00    (2006.01)
G06F 3/01    (2006.01)
G06K 9/46    (2006.01)
G06K 9/62    (2006.01)

(52) U.S. Cl.
CPC ............ *G06K 9/00228* (2013.01); *G06F 3/013* (2013.01); *G06K 9/0061* (2013.01); *G06K 9/4638* (2013.01); *G06K 9/6204* (2013.01)

(58) Field of Classification Search
None
See application file for complete search history.

(56) References Cited

U.S. PATENT DOCUMENTS

| 7,206,435 | B2 | 4/2007 | Fujimura et al. |
| 2007/0013866 | A1 | 1/2007 | Sugita et al. |
| 2007/0036396 | A1* | 2/2007 | Sugita et al. ................... 382/117 |
| 2007/0071287 | A1* | 3/2007 | Sugita et al. ................... 382/117 |
| 2008/0095445 | A1* | 4/2008 | Brandt ........................... 382/203 |
| 2009/0208064 | A1* | 8/2009 | Cambier ........................ 382/110 |
| 2010/0036290 | A1* | 2/2010 | Noguchi et al. .............. 600/595 |
| 2010/0303294 | A1 | 12/2010 | Zschau |
| 2012/0076438 | A1* | 3/2012 | Oka et al. ...................... 382/286 |
| 2012/0177266 | A1* | 7/2012 | Tsukizawa et al. ........... 382/128 |

FOREIGN PATENT DOCUMENTS

JP    6-274269    9/1994
JP    2009-254691    11/2009

OTHER PUBLICATIONS

Basit et al. "Non-circular Pupil Localization in Iris Images," published in 2008.*
Yuuki Hirakawa et al., "Traffic flow measurement by AdaBoost that uses Haar-like features", ViEw2009, Dec. 2009, pp. 104-109 (English Translation 7 pages).

(Continued)

*Primary Examiner* — Barry Drennan
*Assistant Examiner* — Alexander J Lesnick
(74) *Attorney, Agent, or Firm* — Staas & Halsey LLP (57) ABSTRACT

An image processing device includes a memory unit, a candidate pupil detecting unit and a pupil determining unit. The memory unit is used in storing information regarding a pupil size. The candidate pupil detecting unit detects noncircular candidate pupils from an image in which an eye area is captured. The pupil determining unit extrapolates the shapes of the candidate pupils that are detected by the candidate pupil detecting unit and, based on the pupil size stored in the memory unit, determines a pupil from among the candidate pupils.

3 Claims, 9 Drawing Sheets

(56) References Cited

OTHER PUBLICATIONS

Tomoharu Nakahara et al., "Human Detection Method for Autonomous Mobile Robots", Advanced Technologies Development Laboratory, Connector Division, Automation Controls Business Unit, Matsushita Electric Works Technical Report vol. 53 No. 2, pp. 81-85 (English Translation 5 pages).

Xinguang Song et al., "Extraction of Facial Organ Features Using Partial Feature Template and Global Constraints", IEICE, D-II, vol. J77-D-11, No. 8, Aug. 1994, pp. 1601-1609 (English Translation 9 pages).

Yuuki Hirakawa et al., "Traffic flow measurement by AdaBoost that uses Haar-like features", ViEw2009, Dec. 2009, pp. 104-109.

Tomoharu Nakahara et al., "Human Detection Method for Autonomous Mobile Robots", Advanced Technologies Development Laboratory, Connector Division, Automation Controls Business Unit, Matsushita Electric Works Technical Report vol. 53 No. 2, pp. 81-85.

Xinguang Song et al., "Extraction of Facial Organ Features Using Partial Feature Template and Global Constraints", IEICE, D-II, vol. J77-D-11, No. 8, Aug. 1994 pp. 1601-1609.

Extended European Search Report dated Sep. 4, 2014 in corresponding European Patent Application No. 13159591.0.

Talmi et al., "Eye and gaze tracking for visually controlled interactive stereoscopic displays", Signal Processing: Image Communication, 14, 1999, pp. 799-810.

\* cited by examiner

| ID | X-COORDINATE | Y-COORDINATE | RADIUS | LIKELIHOOD |
|---|---|---|---|---|
| 1 | 100 | 150 | 5 | 0.94 |
| 2 | 80 | 120 | 3 | 0.83 |
| 3 | 85 | 100 | 4 | 0.71 |
| 4 | 90 | 110 | 8 | 0.53 |

FIG.4

| LATEST RADIUS | TIMING |
|---|---|
| 3 | 8:50 |

| ID | X-COORDINATE | Y-COORDINATE | RADIUS | LIKELIHOOD |
|---|---|---|---|---|
| 1 | 100 | 150 | 5 | 0.54 |
| 2 | 80 | 120 | 3 | 0.51 |
| 3 | 85 | 100 | 4 | 0.41 |
| 4 | 90 | 110 | 8 | 0.33 |

IMAGE PROCESSING DEVICE AND IMAGE PROCESSING METHOD

CROSS-REFERENCE TO RELATED APPLICATION(S)

This application is based upon and claims the benefit of priority of the prior Japanese Patent Applications No. 2012-061203, filed on Mar. 16, 2012 and No. 2013-012703, filed on Jan. 25, 2013, the entire contents of which are incorporated herein by reference.

FIELD

The embodiment discussed herein is directed to an image processing device.

BACKGROUND

An eye gaze interface technology is available in which the gaze of a user is detected and the detection result is used in operating a computer. If a user makes a visual observation of a position on the screen of an eye gaze interface, then that user can perform operations such as zooming of the observed position or selecting the object at the observed position without having to operate a mouse or a keyboard.

An eye gaze interface detects a gaze by means of a corneal reflex method by which the corneal reflex of a cornea is produced using a near-infrared light source, and the center of the corneal reflex and the center of the corresponding pupil are obtained by means of image processing. Then, in the corneal reflex method, the gaze of the user is detected from the positional relationship between the center of the corneal reflex and the center of the pupil.

Herein, in the corneal reflex method, the premise is to accurately detect a pupil by means of image processing. For that reason, for example, even when a pupil moves under the eyelid, it is imperative that the position of the pupil is detected. Given below is the explanation of exemplary conventional technologies for detecting a pupil.

According to a first conventional technology, from an image that captures an eye, a near-circular portion is inferred to be the pupil and is extrapolated to a circular shape. Then, according to the first conventional technology, pupil detection is done by performing template matching between a predefined template and the template of the image that has been extrapolated to a circular shape.

A second conventional technology is built based on the template matching that is implemented in the first conventional technology described above. According to the second conventional technology; while processing a dynamic image, if the target object is not detected in a particular frame image, then the extrapolation is done using the detection result of the previous frame image. For example, in the second conventional technology; the following rule is applied: if the target object is detected in an area A of a first frame image; then, in a second frame image too, the target object is supposed to be present in the vicinity of an area that is identical to the area A.

According to a third conventional technology, if a plurality of candidate pupils is detected, then a single candidate pupil is selected from among all candidate pupils by referring to the sizes of the candidate pupils or the bounding rectangle area ratios of the candidate pupils. For example, according to the third conventional technology; as far as the size is concerned, if the height and the width of a candidate pupil is within 3 pixels to 30 pixels, then that candidate pupil is treated as a pupil. Meanwhile, in the third conventional technology, the user sets in advance a value that a pupil can have as its size. As for examples of the conventional technologies, see Japanese Laid-open Patent Publication No. 06-274269, Japanese Laid-open Patent Publication No. 2009-254691, "Human Detection Method for Autonomous Mobile Robots", Matsushita Electric Works Technical Report, Vol. 53, No. 2, and "AdaBoost-based traffic flow measurement using Haar-like features", ViEw2009 collection of papers, p. 104, for example.

However, in the conventional technologies, it is not possible to detect a pupil with accuracy.

For example, in the first conventional technology, in the case when the area of an eye has the shadow of the nose reflected in the eye, then it is not possible to distinguish between the reflection and the pupil of that eye. Moreover, since the position of a pupil instantaneous changes in a large way, there are times when the rule of the second conventional technology cannot be applied. Furthermore, in the third conventional technology, the size points to the broad dimensions that a pupil can have. For that reason, in case a plurality of candidate pupils having similar sizes is present, then it is difficult to select the correct pupil.

SUMMARY

According to an aspect of an embodiment, an image processing device includes a memory unit that is used in storing information regarding a pupil size, a candidate pupil detecting unit that detects noncircular candidate pupils from an image in which an eye area is captured, and a pupil determining unit that extrapolates the shapes of the candidate pupils that are detected by the candidate pupil detecting unit and, based on the pupil size stored in the memory unit, determines a pupil from among the candidate pupils.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. However, the present invention is not limited to the embodiment described below.

Figure 1:
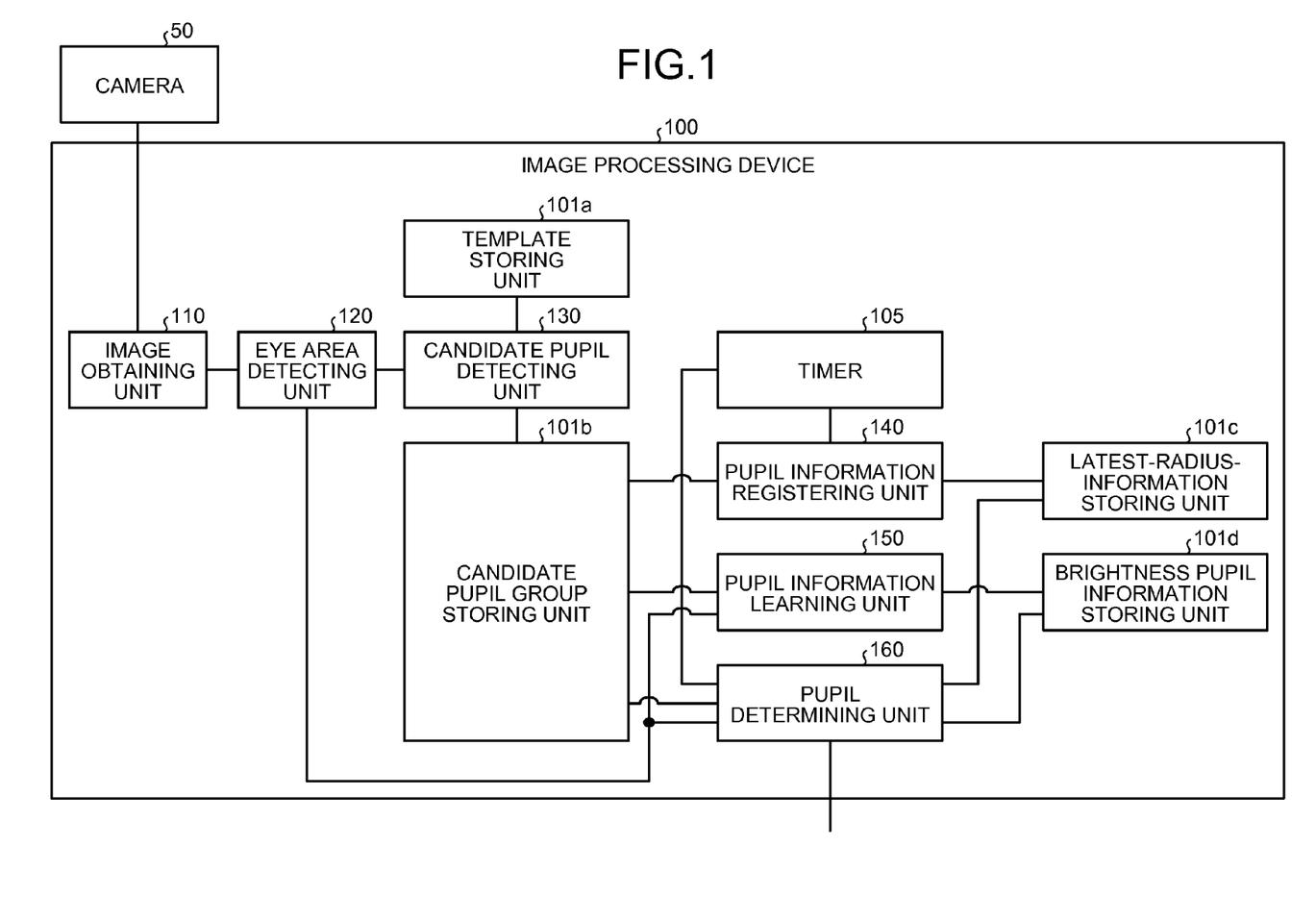
FIG. 1 is a diagram illustrating a configuration of an image processing device according to a first embodiment.

FIG. 1 is a diagram illustrating a configuration of an image processing device according to a first embodiment. As illustrated in FIG. 1, an image processing device 100 is connected to a camera 50. Besides, the image processing device 100 includes a template storing unit 101a, a candidate pupil group storing unit 101b, a latest-radius-information storing unit 101c, and a brightness pupil information storing unit 101d. In addition, the image processing device 100 also includes a timer 105, an image obtaining unit 110, an eye area detecting unit 120, a candidate pupil detecting unit 130, a pupil information registering unit 140, a pupil information learning unit 150, and a pupil determining unit 160.

The camera 50 is an imaging device that captures images. In the first embodiment, for example, the images captured by the camera 50 include face images of the users. The camera 50 sequentially outputs the data of captured images to the image processing device 100.

Figure 2:
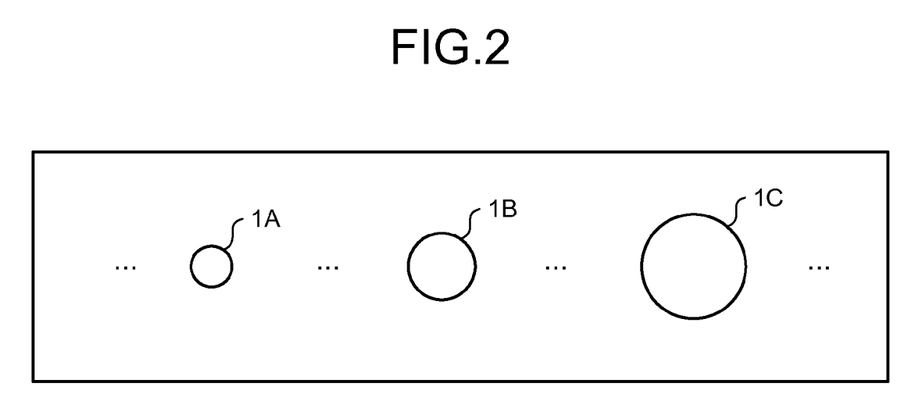
FIG. 2 is a diagram illustrating an exemplary data structure of template information.

The template storing unit 101a is a memory unit that is used in storing template information of various radii. FIG. 2 is a diagram illustrating an exemplary data structure of template information. For example, in the example illustrated in FIG. 2, the template information contains circular templates 1A, 1B, and 1C each having a different radius.

Figure 3:
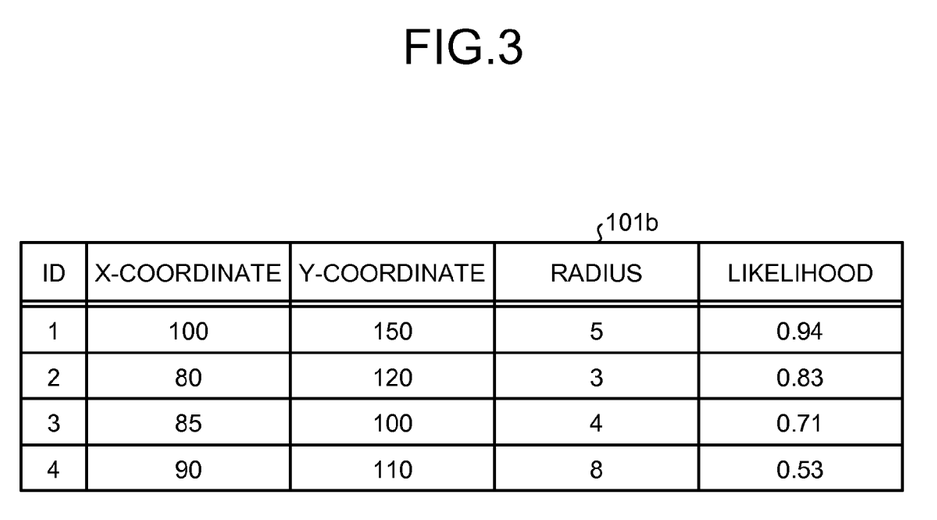
FIG. 3 is a diagram illustrating an exemplary data structure of a candidate pupil group storing unit according to the first embodiment.

The candidate pupil group storing unit 101b is a memory unit that is used in storing a variety of information related to candidate pupils. FIG. 3 is a diagram illustrating an exemplary data structure of the candidate pupil group storing unit. As illustrated in FIG. 3, in the candidate pupil group storing unit 101b; IDs (that enable identification), X-coordinates, Y-coordinates, radii, and likelihoods are stored in a corresponding manner. An ID represents the information that enables unique identification of a candidate pupil. An X-coordinate and a Y-coordinate represent the information indicating the coordinates of a candidate pupil in the image data. A radius represents the information indicating the radius of a candidate pupil. A likelihood represents the information indicating the probability that a candidate pupil is a pupil. Thus, the greater the likelihood, the higher is the probability.

Figure 4:
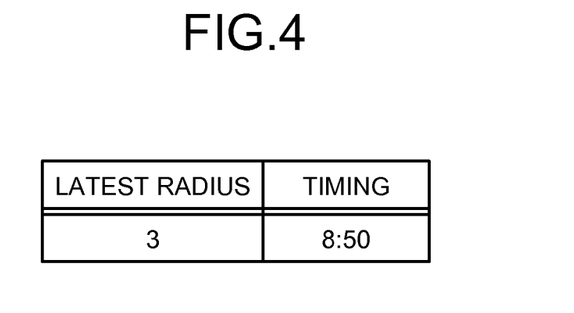
FIG. 4 is a diagram illustrating an exemplary data structure of latest radius information.

The latest-radius-information storing unit 101c is a memory unit that is used in storing the information regarding the size of the pupil that was last detected by the pupil information registering unit 140 (described later). Herein, the information regarding the size of the pupil that was last detected by the pupil information registering unit 140 is referred to as latest radius information. FIG. 4 is a diagram illustrating an exemplary data structure of the latest radius information. As illustrated in FIG. 4, the latest radius information contains the latest radius and a timing in a corresponding manner. Moreover, the latest radius information represents the information that indicates the radius of the pupil which was last detected by the pupil information registering unit 140. The timing represents the information indicating the timing at which the pupil information registering unit 140 last detected a pupil. Herein, every time the pupil information registering unit 140 detects a pupil, the latest radius information is updated.

Figure 5:
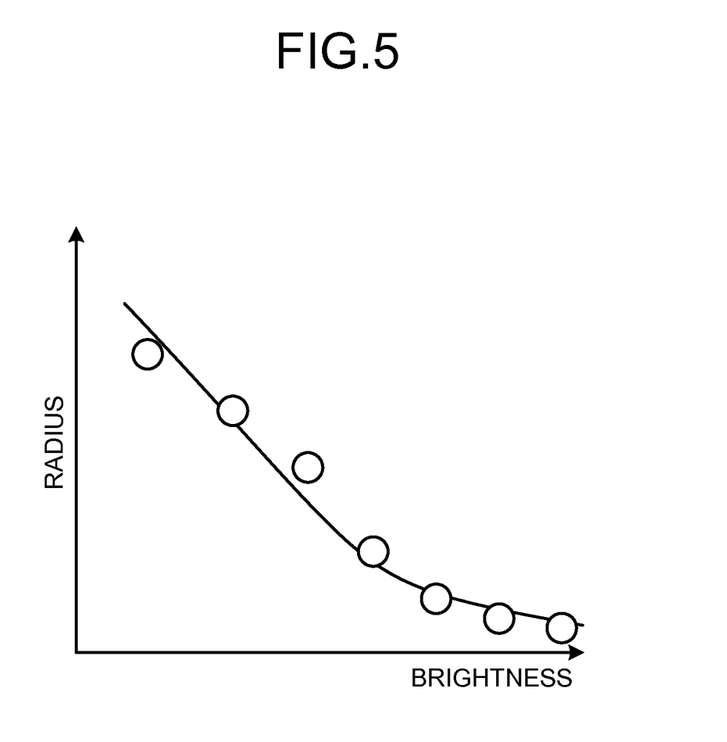
FIG. 5 is a diagram illustrating an exemplary data structure of brightness pupil information.

The brightness pupil information storing unit 101d is a memory unit that is used in storing brightness pupil information which indicates the brightness and the radius of a pupil. FIG. 5 is a diagram illustrating an exemplary data structure of the brightness pupil information. In FIG. 5, the horizontal direction represents the brightness and the vertical direction represents the radius. As illustrated in FIG. 5, as the brightness increases, the radius of the pupil decreases. Meanwhile, the brightness pupil information is generated by the pupil information learning unit 150 (described later).

Herein, each of the storing units 101a to 101d can be a semiconductor memory device such as a random access memory (RAM), a read only memory (ROM), or a flash memory. Alternatively, each of the storing units 101a to 101d can be a memory device such as a hard disk or an optical disk.

The timer 105 outputs timing information to the pupil information registering unit 140 and to the pupil determining unit 160.

The image obtaining unit 110 is a processing unit that sequentially obtains image data from the camera 50 and outputs the image data to the eye area detecting unit 120.

Figure 6:
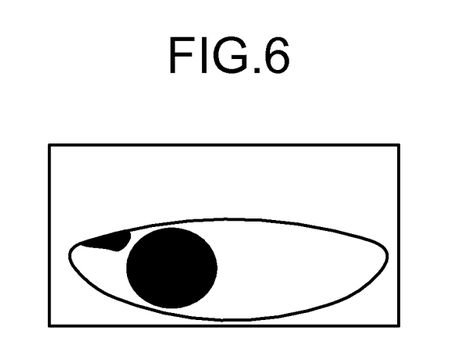
FIG. 6 is a diagram illustrating an exemplary eye area.

The eye area detecting unit 120 is a processing unit that detects an eye area from the image data. Then, the eye area detecting unit 120 outputs the information about the eye area to the candidate pupil detecting unit 130. FIG. 6 is a diagram illustrating an example of the eye area.

Given below is the explanation regarding an eye area detection operation. From the image data, the eye area detecting unit 120 detects an area having eyelike features as the eye area. For example, the eye area detecting unit 120 identifies a circular area from the image data and, if the brightness value around the circular shape is lower as compared to the brightness value of other areas in the image data, detects the area around the circular shape as the eye area. Alternatively, the eye area detecting unit 120 can also implement a known technology to extract the eye area. For example, one such known technology is <"Extraction of Facial Organ Features Using Partial Feature Template and Global Constraints" Journal of The Institute of Electronics, Information, and Communication Engineers, D-11, information/system, II-information processing J77-D-2(8), 1601-1609, 1994-08-25>.

In the known technology mentioned above, the area of a facial organ such as an eye is detected by making use of the property that the local portions, such as facial organs, undergo a smaller amount of change in corners than the changes in the shape of the entire face. In the case of detecting a facial organ, if the shape of the entire face is treated as a single unit; then factors such as individuality, expressions, the lighting condition, and the face orientation lead to changes in the target image. As a result, the recognition result is not stable. For example, in the conventional technology, a partial feature template (PFT) is used that represents the partial features of the facial organs.

The partial feature template is a model created by generalizing a pattern that is obtained by binarizing an edge image in which the corner portions of an eye are captured. The partial feature template includes three portions, namely, an edge portion, a non-edge portion, and an unprocessed portion. For example, the eye area detecting unit 120 performs matching of the partial feature template and the image data; calculates the degree of similarity; and detects an area having the degree of similarity equal to or greater than a threshold value as the eye area. Apart from that, since the other specific operations are disclosed in the conventional technology mentioned above, the explanation of those operations is not given here.

Moreover, the eye area detecting unit 120 calculates the brightness of the eye area and outputs the information of the calculated brightness to the pupil information learning unit 150 and to the pupil determining unit 160. Herein, the brightness of an eye area points to, for example, the average of brightness values of the pixels included in that eye area.

The candidate pupil detecting unit 130 is a processing unit that detects the candidate pupils from the eye area information and stores the detection result in the candidate pupil group storing unit 101b. Given below is a specific explanation of the operations performed by the candidate pupil detecting unit 130. Every time the eye area information is obtained, the candidate pupil detecting unit 130 repeats the operations described below and updates the candidate pupil group storing unit 101b.

Figure 7:
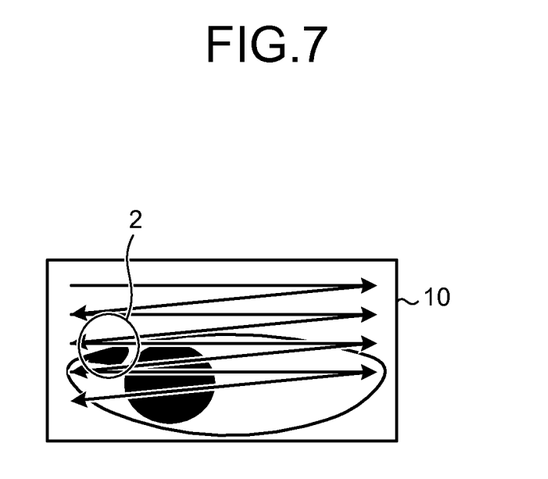
FIG. 7 is a diagram for explaining the operations performed by the candidate pupil detecting unit according to the first embodiment.

FIG. 7 is a diagram for explaining the operations performed by the candidate pupil detecting unit 130. As illustrated in FIG. 7, the candidate pupil detecting unit 130 scans a template 2 over eye area information 10 and detects an area that partially matches with the outline of the template 2 as a candidate pupil. The candidate pupil detecting unit 130 obtains the information regarding the template 2 from the template storing unit 101a. Herein, the template 2 illustrated in FIG. 7 corresponds to either one of the templates 1A, 1B, and 1C illustrated in FIG. 2. Once the scanning of the template 2 having a particular size is completed, the candidate pupil detecting unit 130 changes the size of the template 2 and repeats the operations described above so as to detect a candidate pupil.

When a candidate pupil is detected using the template, the candidate pupil detecting unit 130 stores that candidate pupil in the candidate pupil group storing unit 101b in a corresponding manner to the ID of that candidate pupil, the X-coordinate of that candidate pupil, the Y-coordinate of that candidate pupil, and the radius of that candidate pupil. Herein, the X-coordinate and the Y-coordinate of a candidate pupil point to the central coordinate after the candidate pupil is extrapolated to a circular shape using the template. Moreover, the radius of a candidate pupil points to the radius of the circle after the candidate pupil is extrapolated to a circular shape using the template.

Figure 8:
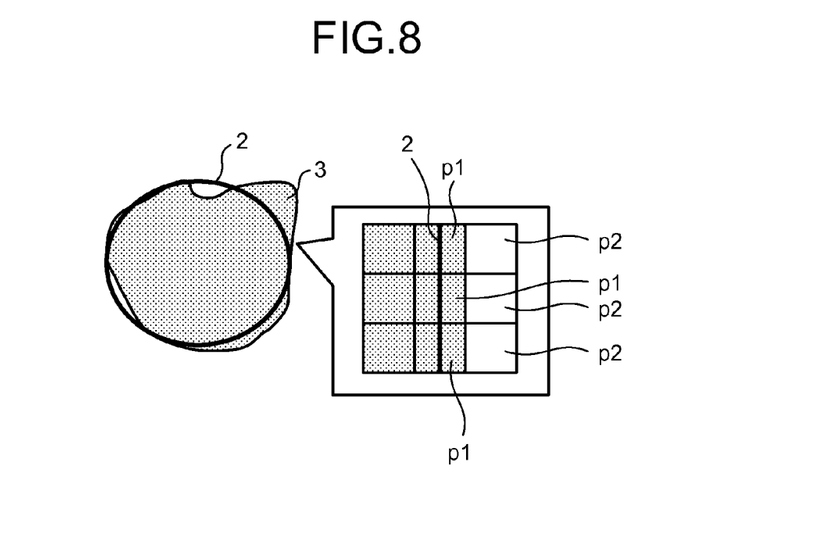
FIG. 8 is a diagram for explaining the operation for calculating likelihood.

Furthermore, from a candidate pupil, the candidate pupil detecting unit 130 calculates the likelihood. FIG. 8 is a diagram for explaining the operation for calculating the likelihood. In FIG. 8, the template 2 and a candidate pupil 3 are used. The candidate pupil detecting unit 130 compares the brightness value of a pixel p1 present on the circumference of the template 2 with the brightness value of a pixel p2 present adjacent to the pixel p1 and on the outside of the template 2. Then, from among all pairs of the pixel p1 and the pixel p2, the candidate pupil detecting unit 130 counts the number of pixels p1 regarding each of which the difference between that pixel p1 and the corresponding pixel p2 is equal to or greater than a threshold value. In the following explanation, the number of pixels p1 regarding each of which the difference between that pixel p1 and the corresponding pixel p2 is equal to or greater than a threshold value is referred to as a circumferential pixel count.

The candidate pupil detecting unit 130 calculates the likelihood of a candidate pupil according to Equation (1) given below, in which T represents the total number of pixels p1 on the template and N represents the circumferential pixel count. Thus, the candidate pupil detecting unit 130 performs the operations explained with reference to FIG. 8 for each candidate pupil and calculates the likelihood of each candidate pupil. Then, the candidate pupil detecting unit 130 stores each calculated likelihood in the candidate pupil group storing unit 101b.

$$\text{likelihood} = N/T \tag{1}$$

The pupil information registering unit 140 is a processing unit that generates the latest radius information based on the candidate pupil group storing unit 101b. That is, the pupil information registering unit 140 refers to the candidate pupil group storing unit 101b and determines that a candidate pupil which has the likelihood exceeding a predetermined threshold value and which has the largest likelihood among the candidate pupils is the pupil. Herein, the radius of the candidate pupil that is determined to be the pupil by the pupil information registering unit 140 is referred to as latest radius. Then, the pupil information registering unit 140 generates the latest radius information in which the latest radius is held in a corresponding manner to the timing obtained from the timer 105, and stores the latest radius information in the latest-radius-information storing unit 101c.

The operations performed by the pupil information registering unit 140 are explained with reference to, for example, FIG. 3. Herein, the predetermined threshold value is assumed to be "0.8". In the example illustrated in FIG. 3, the candidate pupil having the ID "1" has the likelihood exceeding the predetermined threshold value as well as has the largest likelihood. In this case, the latest radius becomes equal to "5".

Meanwhile, in case there does not exist any candidate pupil that exceeds the predetermined threshold value, then the pupil information registering unit 140 refrains from performing the operations until the data in the candidate pupil group storing unit 101b gets updated. Once the data in the candidate pupil group storing unit 101b gets updated, the pupil information registering unit 140 repeats the operations described above. Then, the pupil information registering unit 140 registers the latest radius information at the most recent timing in the latest-radius-information storing unit 101c.

The pupil information learning unit 150 is a processing unit that generates the brightness pupil information based on the candidate pupil group storing unit 101b. That is, the pupil information learning unit 150 refers to the candidate pupil group storing unit 101b and determines that a candidate pupil which has the likelihood exceeding a predetermined threshold value and which has the largest likelihood among the candidate pupils is the pupil. Then, the pupil information learning unit 150 generates the brightness pupil information in which the radius of the determined pupil is held in a corresponding manner to the brightness of the eye area.

The pupil information learning unit 150 obtains the brightness information from the eye area detecting unit 120. Herein, the operation performed by the pupil information learning unit 150 to determine the pupil from the candidate pupils is identical to the operation performed by the pupil information registering unit 140. Every time the data in the candidate pupil group storing unit 101b gets updated, the pupil information learning unit 150 repeats the operations described above and generates the pupil brightness information.

The pupil determining unit 160 is a processing unit that determines the pupil based on the candidate pupil group storing unit 101b, the latest-radius-information storing unit 101c, and the brightness pupil information storing unit 101d. Then, the pupil determining unit 160 outputs the determination result to an external device. Herein, the determination result includes, for example, the central coordinate of the pupil. The external device points to a gaze detecting device that detects a gaze by means of the corneal reflex method.

Firstly, the pupil determining unit 160 refers to the candidate pupil group storing unit 101b and determines whether or not there exists a candidate pupil having the likelihood exceeding a predetermined threshold value. If there exists a candidate pupil having the likelihood exceeding a predetermined threshold value, then the pupil determining unit 160 determines that the candidate pupil having the largest likelihood among the candidate pupils is the pupil.

Given below is the explanation regarding a case when there does not exist any candidate pupil that has the likelihood exceeding the predetermined threshold value. In that case, the pupil determining unit 160 compares the current timing with the timing corresponding to the latest radius information. Herein, the pupil determining unit 160 obtains the current timing from the timer 105 and obtains the latest radius information from the latest-radius-information storing unit 101c. Given below is the explanation regarding the operations performed by the pupil determining unit 160 when the time difference between the current timing is smaller than a predetermined amount of time and regarding the operations performed by the pupil determining unit 160 when the time difference between the current timing is equal to or greater than the predetermined amount of time.

Figure 9:
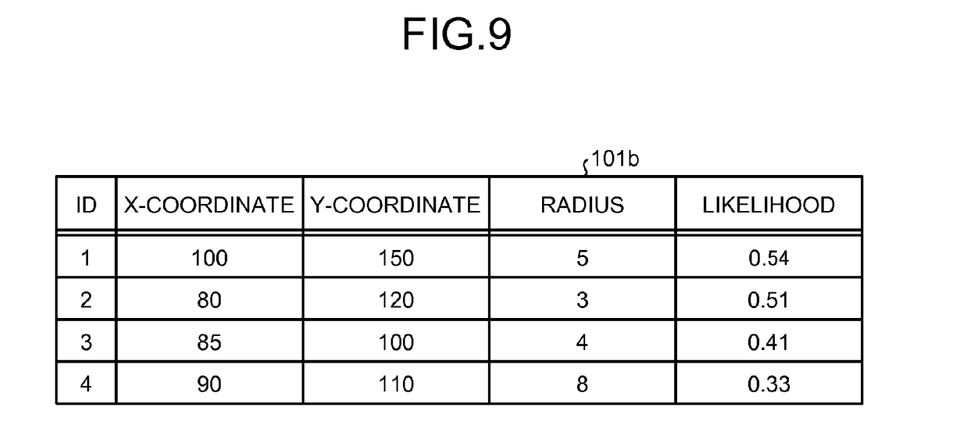
FIG. 9 is a diagram illustrating an exemplary data structure of the candidate pupil group storing unit according to the first embodiment in the case when the likelihoods are smaller than a predetermined threshold value.

In the case when the time difference between the current timing is smaller than the predetermined amount of time, the pupil determining unit 160 determines that the candidate pupil which has the closest radius to the radius specified in the latest radius information is the pupil. FIG. 9 is a diagram illustrating an exemplary data structure of the candidate pupil group storing unit 101b in the case when the likelihoods are smaller than a predetermined threshold value. The operations of the pupil determining unit 160 are explained with reference to FIG. 9. Herein, the predetermined threshold value is assumed to be "0.8". Moreover, the latest radius information is assumed to contain the latest radius of "3".

The pupil determining unit 160 determines that the candidate pupil which has the closest radius to the latest radius is the pupil. In the example illustrated in FIG. 9, the candidate pupil having the ID "2" has the closest radius to the latest radius of "3". Hence, the pupil determining unit 160 determines that the candidate pupil having the ID "2" is the pupil.

On the other hand, in the case when the time difference between the current timing is equal to or greater than the predetermined amount of time, the pupil determining unit 160 compares the current brightness with the brightness pupil information, and determines the radius that corresponds to the current brightness. Herein, the pupil determining unit 160 obtains the information regarding the current brightness from the eye area detecting unit 120 and obtains the brightness pupil information from the brightness pupil information storing unit 101d. Then, the pupil determining unit 160 determines that the candidate pupil having the closest radius to the radius corresponding to the current brightness as the pupil.

For example, assume that the radius of "4" corresponds to the current brightness. In the example illustrated in FIG. 9, the candidate pupil having the ID "3" has the closest radius to the radius of "4". Hence, the pupil determining unit 160 determines that the candidate pupil having the ID "3" is the pupil.

Figure 10:
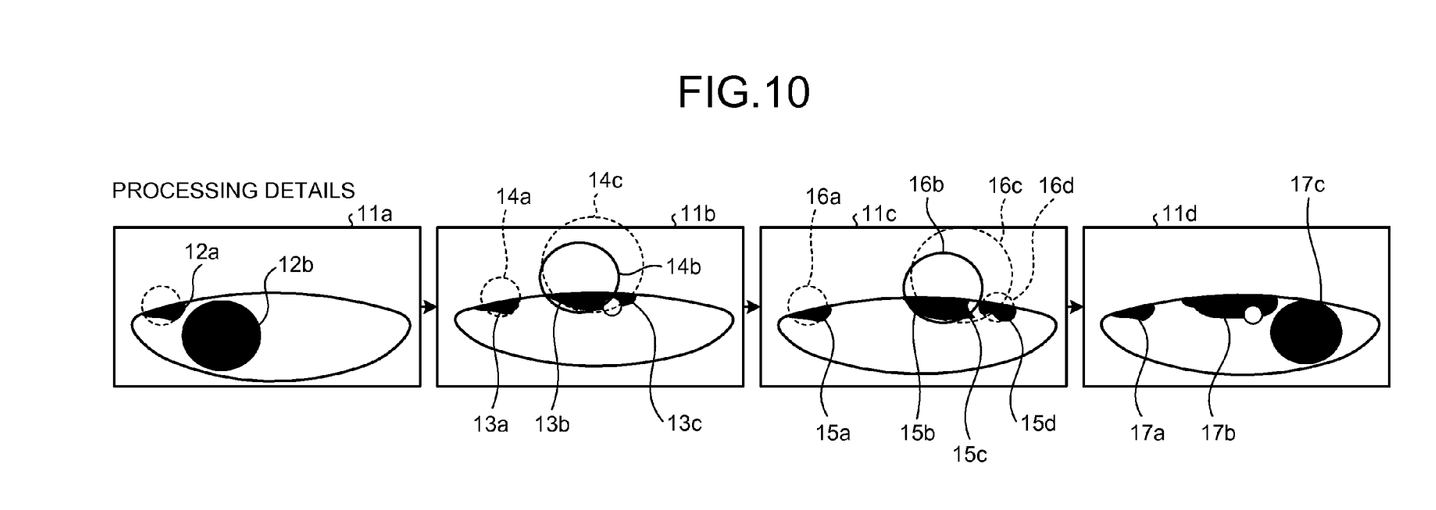
FIG. 10 is a diagram for explaining an example of operations performed in the image processing device according to the first embodiment.

Given below is the explanation of an example of operations performed in the image processing device 100 with reference to an exemplary set of image data. FIG. 10 is a diagram for explaining an example of operations performed in the image processing device 100.

In the example illustrated in FIG. 10, the image processing device 100 processes images 11a, 11b, 11c, and 11d in that order. Each of the images 11a to 11d is an image of an eye area detected by the eye area detecting unit 120. Moreover, it is assumed that the images 11a, 11b, 11c, and 11d are captured at timings t, t+1, t+2, and t+3, respectively.

Given below is the explanation regarding the processing of the image 11a. In the image processing device 100, the candidate pupil detecting unit 130 performs template matching and detects candidate pupils from the image 11a. For example, from the image 11a, the candidate pupil detecting unit 130 detects candidate pupils 12a and 12b. Herein, it is assumed that the candidate pupil 12a has the likelihood equal to or greater than a predetermined threshold value, and it is assumed that the candidate pupil 12b has the likelihood greater than the candidate pupil 12a. In that case, the pupil determining unit 160 of the image processing device 100 determines that the candidate pupil 12b is the pupil. Moreover, the pupil information registering unit 140 of the image processing device 100 generates the latest radius information in which the radius of the candidate pupil 12b is held as the latest radius.

Given below is the explanation regarding the processing of the image lib. In the image processing device 100, the candidate pupil detecting unit 130 performs template matching and detects candidate pupils from the image 11b. For example, from the image 11b, the candidate pupil detecting unit 130 detects candidate pupils 13a, 13b, and 13c. Herein, it is assumed that each of the candidate pupils 13a to 13c has the likelihood smaller than the predetermined threshold value. In that case, the pupil determining unit 160 determines the pupil by comparing the radius of the latest pupil 12b with the radii of candidate pupils 14a, 14b, and 14c that are obtained by extrapolation to circular shapes. Herein, the candidate pupils 14a, 14b, and 14c are obtained by extrapolating the candidate pupils 13a, 13b, and 13c, respectively. Then, in the image processing device 100, the candidate pupil 14b having the closest radius to the radius of the pupil 12b is determined to be the pupil. Meanwhile, the time difference between the timing corresponding to the image 11b and the timing corresponding to the latest radius information is assumed to be smaller than a predetermined amount of time.

Given below is the explanation regarding the processing of the image 11c. In the image processing device 100, the candidate pupil detecting unit 130 performs template matching and detects candidate pupils from the image 11c. For example, from the image 11c, the candidate pupil detecting unit 130 detects candidate pupils 15a, 15b, 15c, and 15d. Herein, it is assumed that each of the candidate pupils 15a to 15d has the likelihood smaller than the predetermined threshold value. In that case, the pupil determining unit 160 determines the pupil by comparing the radius of the latest pupil 12b with the radii of candidate pupils 16a, 16b, 16c, and 16d that are obtained by extrapolation to circular shapes. Herein, the candidate pupils 16a, 16b, 16c, and 16d are obtained by extrapolating the candidate pupils 15a, 15b, 15c, and 15d, respectively. Then, in the image processing device 100, the candidate pupil 16b having the closest radius to the radius of the pupil 12b is determined to be the pupil. Meanwhile, the time difference between the timing corresponding to the image 11c and the timing corresponding to the latest radius information is assumed to be smaller than a predetermined amount of time.

However, if the time difference between the timing corresponding to the image 11c and the timing corresponding to the latest radius information is equal to or greater than the predetermined amount of time, then the pupil determining unit 160 compares the current brightness with the brightness pupil information, and determines the radius that corresponds to the current brightness. Then, based on the radius corresponding to the current brightness, the pupil determining unit 160 determines the pupil from among the candidate pupils.

Given below is the explanation regarding the processing of the image 11d. In the image processing device 100, the candidate pupil detecting unit 130 performs template matching and detects candidate pupils from the image 11d. For example, from the image 11d, the candidate pupil detecting unit 130 detects candidate pupils 17a, 17b, and 17c. Herein, it is assumed that the candidate pupil 17c has the likelihood not only equal to or greater than the predetermined threshold value but also greater than the likelihoods of the candidate pupils 17a and 17b. Herein, the pupil determining unit 160 of the image processing device 100 determines that the candidate pupil 17c is the pupil. Moreover, the pupil information registering unit 140 of the image processing device 100 generates the latest radius information in which the radius of the candidate pupil 17c is held as the latest radius.

Figure 11:
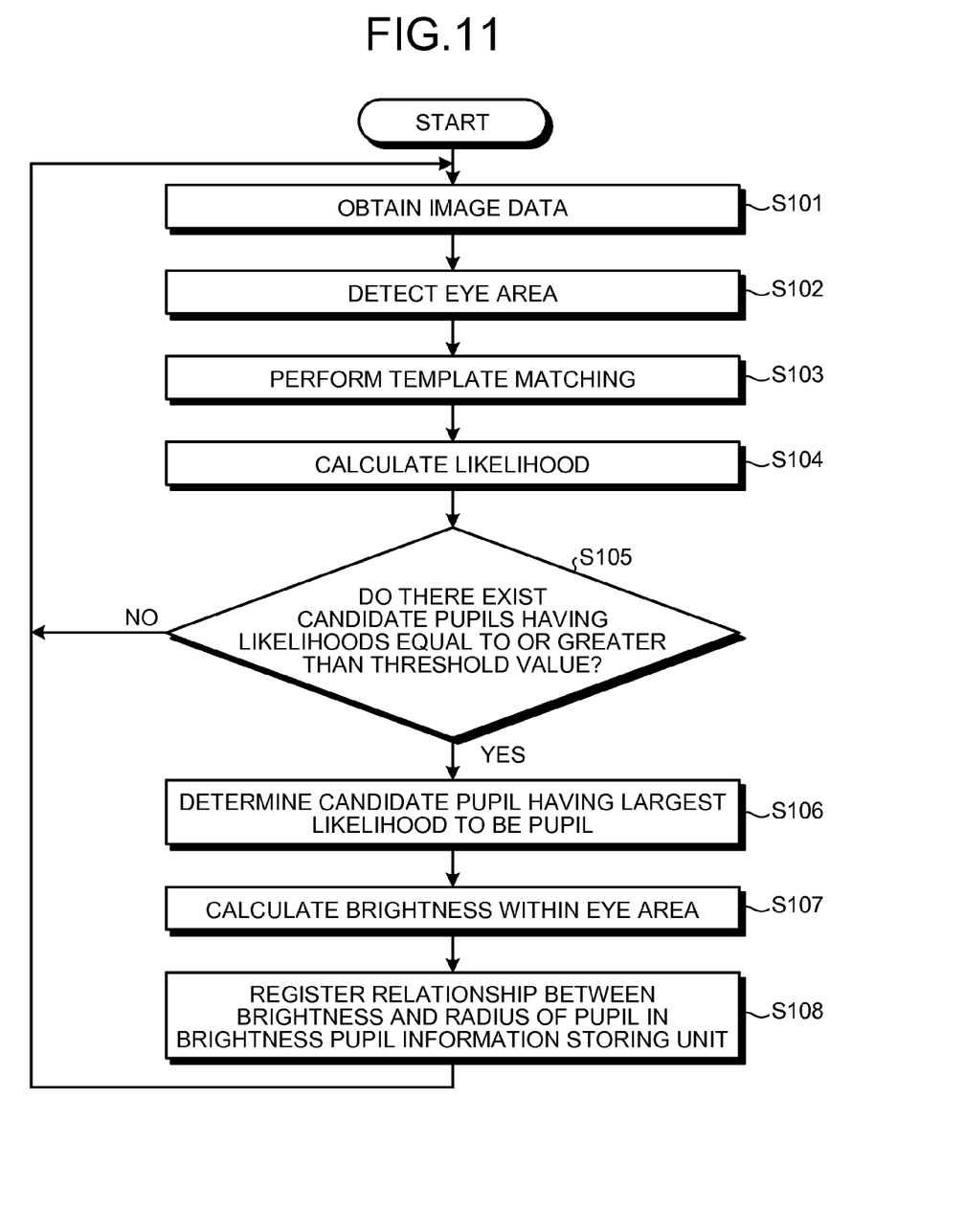
FIG. 11 is a flowchart for explaining a sequence of operations performed to generate the brightness pupil information.

Given below is the explanation regarding a sequence of operations performed by the image processing device according to the first embodiment to generate the brightness pupil information. FIG. 11 is a flowchart for explaining a sequence of operations performed to generate the brightness pupil information. The operations illustrated in FIG. 11 are performed in response to the obtaining of image data. As illustrated in FIG. 11, the image processing device 100 obtains image data (Step S101) and detects an eye area (Step S102).

Then, the image processing device 100 performs template matching (Step S103) and calculates likelihoods (Step S104). Subsequently, the image processing device 100 determines whether or not there exist candidate pupils having the likelihoods equal to or greater than a threshold value (Step S105). If there does not exist any candidate pupil that has the likelihood equal to or greater than the threshold value (No at Step S105), then the system control returns to Step S101.

On the other hand, if there exist candidate pupils having the likelihoods equal to or greater than the threshold value (Yes at Step S105); then the image processing device 100 determines that the candidate pupil having the largest likelihood is the pupil (Step S106).

Then, the image processing device 100 calculates the brightness within the eye area (Step S107) and registers the relationship between the brightness and the radius of the pupil in the brightness pupil information storing unit 101d (Step S108). Then, the system control returns to Step S101.

Figure 12:
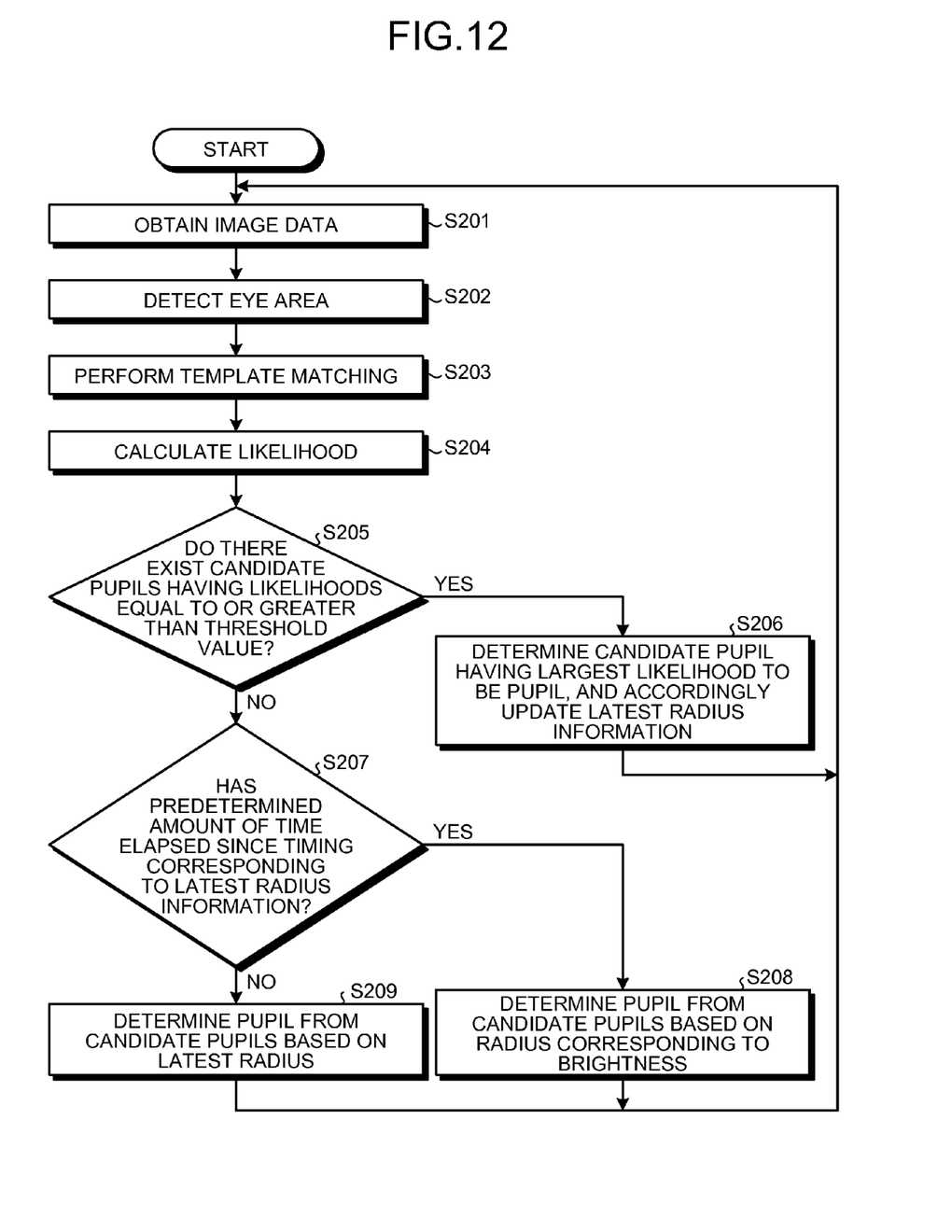
FIG. 12 is a flowchart for explaining a sequence of operations performed by the image processing device according to the first embodiment to determine a pupil.

Given below is the explanation regarding a sequence of operations performed by the image processing device according to the first embodiment to determine a pupil. FIG. 12 is a flowchart for explaining a sequence of operations performed to determine a pupil. The operations illustrated in FIG. 12 are performed in response to the obtaining of image data. As illustrated in FIG. 12, the image processing device 100 obtains image data (Step S201) and detects an eye area (Step S202).

Then, the image processing device 100 performs template matching (Step S203) and calculates likelihoods (Step S204). Subsequently, the image processing device 100 determines whether or not there exist candidate pupils having the likelihoods equal to or greater than a threshold value (Step S205).

If there exist candidate pupils having the likelihoods equal to or greater than the threshold value (Yes at Step S205), then the image processing device 100 determines that the candidate pupil having the largest likelihood is the pupil and accordingly updates the latest radius information (Step S206). Then, the system control returns to Step S201.

On the other hand, if there does not exist any candidate pupil that has the likelihood equal to or greater than the threshold value (No at Step S205), then the image processing device 100 determines whether or not a predetermined amount of time has elapsed since the timing corresponding to the latest radius information (Step S207).

If the predetermined amount of time has elapsed since the timing corresponding to the latest radius information (Yes at Step S207), then the image processing device 100 determines the pupil from the candidate pupils on the basis of the radius corresponding to the brightness (Step S208). Then, the system control returns to Step S201.

On the other hand, if the predetermined amount of time has not elapsed since the timing corresponding to the latest radius information (No at Step S207), then the image processing device 100 determines the pupil from the candidate pupils on the basis of the latest radius (Step S209). Then, the system control returns to Step S201.

Given below is the explanation regarding the effect achieved by the image processing device 100. In the case when a pupil is detected in advance with accuracy, then the image processing device 100 learns about the size of that pupil. Subsequently, the image processing device 100 extrapolates the candidate pupils that are detected from the eye area; and determines the pupil from the candidate pupils on the basis of the sizes of the extrapolated candidate pupils and the size of the most recent pupil that was learnt in advance. For that reason, even when a pupil moves under the eyelid, it becomes possible to detect the pupil with accuracy.

Every time a pupil is detected with accuracy, the image processing device 100 updates the latest radius information. That enables accurate pupil detection in response to the changes in the pupils.

Meanwhile, in the case when a pupil is to be determined from the candidate pupils after the elapse of a predetermined amount of time from the timing of learning the size of the earlier pupil, the image processing device 100 identifies the size of the pupil corresponding to the current brightness on the basis of the relationship between the brightness and the sizes of the pupils. Then, the image processing device 100 determines the pupil on the basis of the size of the pupil corresponding to the identified brightness and the sizes of the candidate pupils. For that reason, it becomes possible to accurately determine the pupil in accordance with the sizes of the pupils that change according to the brightness.

Meanwhile, each of the image obtaining unit 110, the eye area detecting unit 120, the candidate pupil detecting unit 130, the pupil information registering unit 140, the pupil information learning unit 150, and the pupil determining unit 160 corresponds to an integrated device such as an application specific integrated circuit (ASIC) or a field programmable gate array. Alternatively, for example, each of the image obtaining unit 110, the eye area detecting unit 120, the candidate pupil detecting unit 130, the pupil information registering unit 140, the pupil information learning unit 150, and the pupil determining unit 160 corresponds to an electronic circuit such as a central processing unit (CPU) or a micro processing unit (MPU).

The constituent elements of the image processing device 100 according to the first embodiment are merely conceptual, and need not be physically configured as illustrated. The constituent elements, as a whole or in part, can be separated or integrated either functionally or physically based on various types of loads or use conditions. The process functions performed by the device are entirely or partially realized by the CPU or computer programs that are analyzed and executed by the CPU, or realized as hardware by wired logic.

Figure 13:
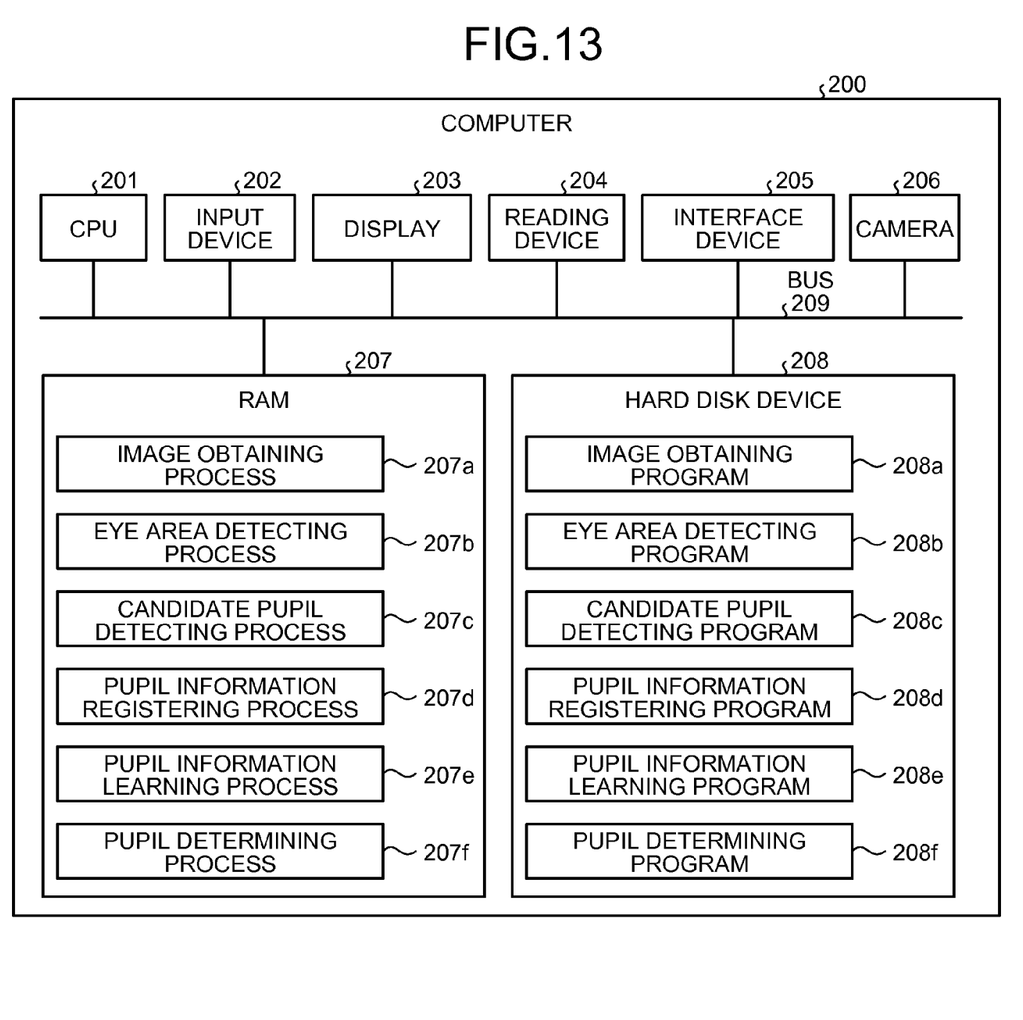
FIG. 13 is a diagram illustrating an example of a computer that executes an image processing program according to the first embodiment.

FIG. 13 is a diagram illustrating an example of a computer that executes an image processing program. As illustrated in FIG. 13, a computer 200 includes a CPU 201 that performs various operations, an input device 202, and a display 203. In addition, the computer 200 also includes a reading device 204 that reads computer programs from a recording medium and an interface device 205 that communicates data with other computers via a network. Besides, the computer 200 also includes a camera 206. Moreover, the computer 200 also includes a RAM 207, which is used in storing a variety of information on a temporary basis, and a hard disk device 208. All the constituent elements 201 to 208 are interconnected by a bus 209.

The hard disk device 208 is used in storing an image obtaining program 208a, an eye area detecting program 208b, a candidate pupil detecting program 208c, a pupil information registering program 208d, a pupil information learning program 208e, and a pupil determining program 208f. The CPU 201 reads those computer programs 208a to 208f and loads them in the RAM 207.

The image obtaining program 208a functions as an image obtaining process 207a. The eye area detecting program 208b functions as an eye area detecting process 207b. The candidate pupil detecting program 208c functions as a candidate pupil detecting process 207c. The pupil information registering program 208d functions as a pupil information registering process 207d. The pupil information learning program 208e functions as a pupil information learning process 207e. The pupil determining program 208f functions as a pupil determining process 207f.

For example, the image obtaining process 207a corresponds to the image obtaining unit 110. The eye area detecting process 207b corresponds to the eye area detecting unit 120. The candidate pupil detecting process 207c corresponds to the candidate pupil detecting unit 130. The pupil information registering process 207d corresponds to the pupil information registering unit 140. The pupil information learning program 208e corresponds to the pupil information learning unit 150. The pupil determining program 208f corresponds to the pupil determining unit 160.

Meanwhile, the computer programs 208a to 208f may be stored in the hard disk device 208 from the beginning. Alternatively, for example, the computer programs 208a to 208f can be stored in a portable physical medium such as a flexible disk (FD), a compact disk read only memory (CD-ROM), a digital versatile disk (DVD), a magnetic optical disk, or an IC card that can be inserted in the computer 200. Then, the computer 200 can read the computer programs 208a to 208f from the portable physical medium and execute them.

As described above, according to one aspect of an embodiment, the image processing device disclosed herein can detect a pupil with accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image processing device comprising:
a memory unit that is used in storing information regarding a pupil size which is previously detected in series of successive detections;
a candidate pupil detecting unit that detects noncircular candidate pupils from an image in which an eye area is captured;
a pupil determining unit that extrapolates the shapes of the candidate pupils that are detected by the candidate pupil detecting unit and, based on the pupil size stored in the memory unit, determines a pupil from among the candidate pupils;
a pupil information learning unit that, when a circular pupil is detected and extrapolated by the pupil determining unit from the image in which an eye area is captured, stores brightness pupil information, in which the size of the detected pupil and the brightness of the eye area is held in a corresponding manner, in the memory unit; and
a pupil information registering unit that stores a detection timing at which a pupil was detected in previously evaluated frame and the size of a pupil in a corresponding manner in the memory unit,
wherein when the time difference between the timing at which a candidate pupil is detected and the detection timing stored in the memory unit is equal to or greater than a predetermined amount of time, the pupil determining unit compares the brightness of the eye area with the brightness pupil information, identifies the pupil size in the brightness pupil information, and determines a pupil from among the candidate pupils based on the identified pupil size.

2. A computer-readable non-transitory medium having stored therein a program for causing a computer to execute an image processing program comprising:
storing information regarding a pupil size which is previously detected in series of successive detections in a memory device;
detecting noncircular candidate pupils from an image in which an eye area is captured;
determining that includes extrapolating the shapes of the candidate pupils and determining, based on the pupil size stored in the memory device, a pupil from among the candidate pupils;
storing brightness pupil information, in which the size of the detected pupil and the brightness of the eye area is held in a corresponding manner in the memory unit, when a circular pupil is detected and extrapolated by the determining from the image in which an eye area is captured; and
storing a detection timing at which a pupil was detected in previously evaluated frame and the size of a pupil in a corresponding manner in the memory unit,
wherein when the time difference between the timing at which a candidate pupil is detected and the detection timing stored in the memory unit is equal to or greater than a predetermined amount of time, the determining compares the brightness of the eye area with the brightness pupil information, identifies the pupil size in the brightness pupil information, and determines a pupil from among the candidate pupils based on the identified pupil size.

3. An image processing method for causing a computer to execute:
storing information regarding a pupil size which is previously detected in series of successive detections in a memory device;
detecting noncircular candidate pupils from an image in which an eye area is captured;

determining that includes extrapolating the shapes of the candidate pupils and determining, based on the pupil size stored in the memory device, a pupil from among the candidate pupils;

storing brightness pupil information, in which the size of the detected pupil and the brightness of the eye area is held in a corresponding manner in the memory unit, when a circular pupil is detected and extrapolated by the determining from the image in which an eye area is captured; and storing a detection timing at which a pupil was detected in previously evaluated frame and the size of a pupil in a corresponding manner in the memory unit, wherein when the time difference between the timing at which a candidate pupil is detected and the detection timing stored in the memory unit is equal to or greater than a predetermined amount of time, the determining compares the brightness of the eye area with the brightness pupil information, identifies the pupil size in the brightness pupil information, and determines a pupil from among the candidate pupils based on the identified pupil size.

\* \* \* \* \*